(12) United States Patent
Murata et al.

(10) Patent No.: US 7,842,902 B2
(45) Date of Patent: Nov. 30, 2010

(54) LASER PROCESSING METHOD AND LASER BEAM PROCESSING MACHINE

(75) Inventors: Masahiro Murata, Tokyo (JP); Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 719 days.

(21) Appl. No.: 11/898,214

(22) Filed: Sep. 10, 2007

(65) Prior Publication Data

US 2008/0061044 A1 Mar. 13, 2008

(30) Foreign Application Priority Data

Sep. 11, 2006 (JP) ............... 2006-245054

(51) Int. Cl.
*B23K 26/36* (2006.01)
*B23K 26/40* (2006.01)
*H01L 21/46* (2006.01)
*H01L 21/78* (2006.01)
*H01L 21/301* (2006.01)

(52) U.S. Cl. ............... 219/121.68; 219/121.69; 438/463

(58) Field of Classification Search ............... 219/121.67–121.69, 121.72; 438/460, 462, 438/463

See application file for complete search history.

(56) References Cited

U.S. PATENT DOCUMENTS

| | | | | |
|---|---|---|---|---|
| 4,729,372 A | * | 3/1988 | L'Esperance, Jr. | ............... 606/5 |
| 5,571,430 A | * | 11/1996 | Kawasaki et al. | ...... 219/121.78 |
| 5,925,271 A | * | 7/1999 | Pollack et al. | ......... 219/121.74 |
| 6,257,224 B1 | | 7/2001 | Yoshino et al. | |
| 6,426,840 B1 | * | 7/2002 | Partanen et al. | ............. 359/823 |
| 6,646,728 B1 | * | 11/2003 | Tang et al. | .................. 356/122 |
| 7,560,397 B2 | * | 7/2009 | Yamazaki et al. | ........... 438/795 |
| 7,605,343 B2 | * | 10/2009 | Lei et al. | ............... 219/121.71 |
| 2006/0035411 A1 | | 2/2006 | Oba et al. | |

FOREIGN PATENT DOCUMENTS

| | | |
|---|---|---|
| JP | 10-305420 | 11/1998 |
| JP | 02000275568 A * | 10/2000 |
| JP | 2006-51517 | 2/2006 |

* cited by examiner

*Primary Examiner*—Samuel M Heinrich
(74) *Attorney, Agent, or Firm*—Smith, Gambrell & Russell, LLP

(57) ABSTRACT

A method of carrying out laser processing along processing lines having linear portions and curved portions formed on a workpiece by using a laser beam processing machine comprising a laser beam application means for applying a laser beam to the workpiece held on a chuck table which comprises a condenser for converging a laser beam, having a focal spot changing means for changing the shape of a focal spot between an elliptic spot and a circular spot, comprising the steps of:

moving a processing line formed on the workpiece to the application position of a laser beam, activating the focal spot changing means to make an elliptic focal spot and positioning the long axis of the elliptic spot along a linear portion of the processing line when the linear portion of the processing line is located at the application position of the laser beam and activating the focal spot changing means to make a circular focal spot when a curved portion of the processing line is located at the application position of the laser beam.

3 Claims, 11 Drawing Sheets

LASER PROCESSING METHOD AND LASER BEAM PROCESSING MACHINE

FIELD OF THE INVENTION

The present invention relates to a method of carrying out laser processing along processing lines having linear portions and curved portions formed on a workpiece and to a laser beam processing machine.

DESCRIPTION OF THE PRIOR ART

In the process of manufacturing an optical device such as CCD, a plurality of areas are sectioned by dividing lines called "streets" arranged in a lattice on the front surface of an optical device wafer, and an optical device such as CCD and the like is formed in each of the sectioned areas. Individual optical devices are manufactured by cutting this optical device wafer along the streets to divide it into the device formed areas.

Cutting along the streets of the optical device wafer is generally carried out by using a cutting machine. When the optical device wafer is cut with the cutting machine, cutting chips adhere to the front surface of an optical device to decrease the quality of the optical device.

Meanwhile, JP-A 10-305420 discloses a method of dividing a workpiece along predetermined processing lines by applying a pulse laser beam along the processing lines formed on the workpiece such as a semiconductor wafer or glass sheet or the like.

JP-A 2006-51517 discloses a method of carrying out laser processing by forming the elliptic focal spot of a laser beam to improve laser processing properties.

A laser beam processing machine for carrying out the above laser processing comprises a chuck table for holding a workpiece, a laser beam application means for applying a laser beam to the workpiece held on the chuck table, a processing feed means for moving the chuck table and the laser beam application means relative to each other in a processing feed direction, and an indexing-feed means for moving the chuck table and the laser beam application means relative to each other in an indexing-feed direction perpendicular to the processing feed direction. Therefore, even when the processing lines formed on the workpiece have linear portions and curved portions, if the focal spot shape of a laser beam applied from the laser beam application means is circular, laser processing can be carried out along the linear portions and the curved portions by controlling the above processing feed means and the above indexing-feed means. However, when the focal spot shape of the laser beam is elliptic, it is difficult to position the long axis of the elliptic focal spot along the processing lines even by controlling the above processing feed means and the above indexing-feed means. Accordingly, the long axis of the elliptic focal spot of the laser beam extends off the processing area in the curved portions and consequently widens the processing width, thereby making it impossible to carry out laser processing with a uniform width along the processing lines having linear portions and curved portions.

SUMMARY OF THE INVENTION

It is an object of the present invention to provide a method capable of carrying out laser processing accurately along processing lines having linear portions and curved portions formed on a workpiece and a laser beam processing machine.

To attain the above object, according to the present invention, there is provided a method of carrying out laser processing along processing lines having linear portions and curved portions formed on a workpiece by using a laser beam processing machine comprising a chuck table for holding the workpiece, a laser beam application means for applying a laser beam to the workpiece held on the chuck table, a processing feed means for moving the chuck table and the laser beam application means relative to each other in a processing feed direction (X direction), and an indexing-feed means for moving the chuck table and the laser beam application means relative to each other in an indexing-feed direction (Y direction) perpendicular to the processing feed direction (X direction), and a condenser in the laser beam application means for converging a laser beam oscillated from a laser beam oscillation means for oscillating a laser beam, which comprises a focal spot changing means for changing the shape of a focal spot between an elliptic spot and a circular spot, wherein the method comprises the step of:

activating the processing feed means and the indexing-feed means to move the processing lines formed on the workpiece to the application position of a laser beam, and activating the focal spot changing means to make an elliptic focal spot and position the long axis of the elliptic focal spot along the linear portions of the processing lines when the linear portions of the processing lines are located at the application position of a laser beam and to make a circular focal spot when the curved portions of the processing lines are located at the application position of the laser beam.

The workpiece is a wafer having a plurality of devices on the front surface which are sectioned by processing lines having linear portions and curved portions and a laser beam is applied along the processing lines.

Further, according to the present invention, there is provided a laser beam processing machine comprising a chuck table for holding a workpiece, a laser beam application means for applying a laser beam to the workpiece held on the chuck table, a processing feed means for moving the chuck table and the laser beam application means relative to each other in a processing feed direction (X direction), an indexing-feed means for moving the chuck table and the laser beam application means relative to each other in an indexing-feed direction (Y direction) perpendicular to the processing feed direction (X direction), a processing feed amount detection means for detecting the processing feed amount of the processing feed means, an indexing feed amount detection means for detecting the indexing feed amount of the indexing-feed means, and a control means for controlling the laser beam application means, the processing feed means and the indexing-feed means based on detection signals from the processing feed amount detection means and the indexing feed amount detection means, wherein the laser beam application means comprises laser beam oscillation means for oscillating a laser beam and a condenser for converging the laser beam oscillated by the laser beam oscillation means, and the condenser comprises a focal spot changing means for changing the shape of a focal spot between an elliptic spot and a circular spot and a focal spot rotating means for rotating the elliptic focal spot formed by the focal spot changing means with the optical axis as the center thereof; and the control means comprises a storage means for storing the X and Y coordinate values of the processing lines having linear portions and curved portions formed on the workpiece, obtains the X and Y coordinate values of the current laser beam application position based on detection signals from the processing feed amount detection means and the indexing feed amount detection means, activates the processing feed means and the indexing-feed means to move a processing line formed on the workpiece to the application position of a laser beam based on the X and Y coordinate values of the processing line stored in the storage means and the X and Y coordinate values of the detected current position, activates the focal spot changing means to make an elliptic focal spot and activates the focal spot rotating means to position the long axis of the elliptic focal spot along a linear portion of the processing line when the linear portion of the processing line is located at the application position of the laser beam, and activates the focal spot changing means to make a circular focal spot when a curved portion of the processing line is located at the application position of the laser beam.

In the laser processing method and the laser beam processing machine according to the present invention, when the linear portions of the processing lines are located at the application position of a laser beam, the focal spot changing means is activated to make an elliptic focal spot and the long axis of the elliptic focal spot is positioned along the linear portions of the processing lines and when the curved portions of the processing lines are located at the application position of a laser beam, the focal spot changing means is activated to make a circular focal spot. Therefore, the linear portions of the processing lines can be processed by means of the elliptic spot having excellent processing properties and the curved portions of the processing lines can be processed accurately by means of the circular spot.

DETAILED DESCRIPTION OF THE PREFERRED EMBODIMENTS

Figure 1:
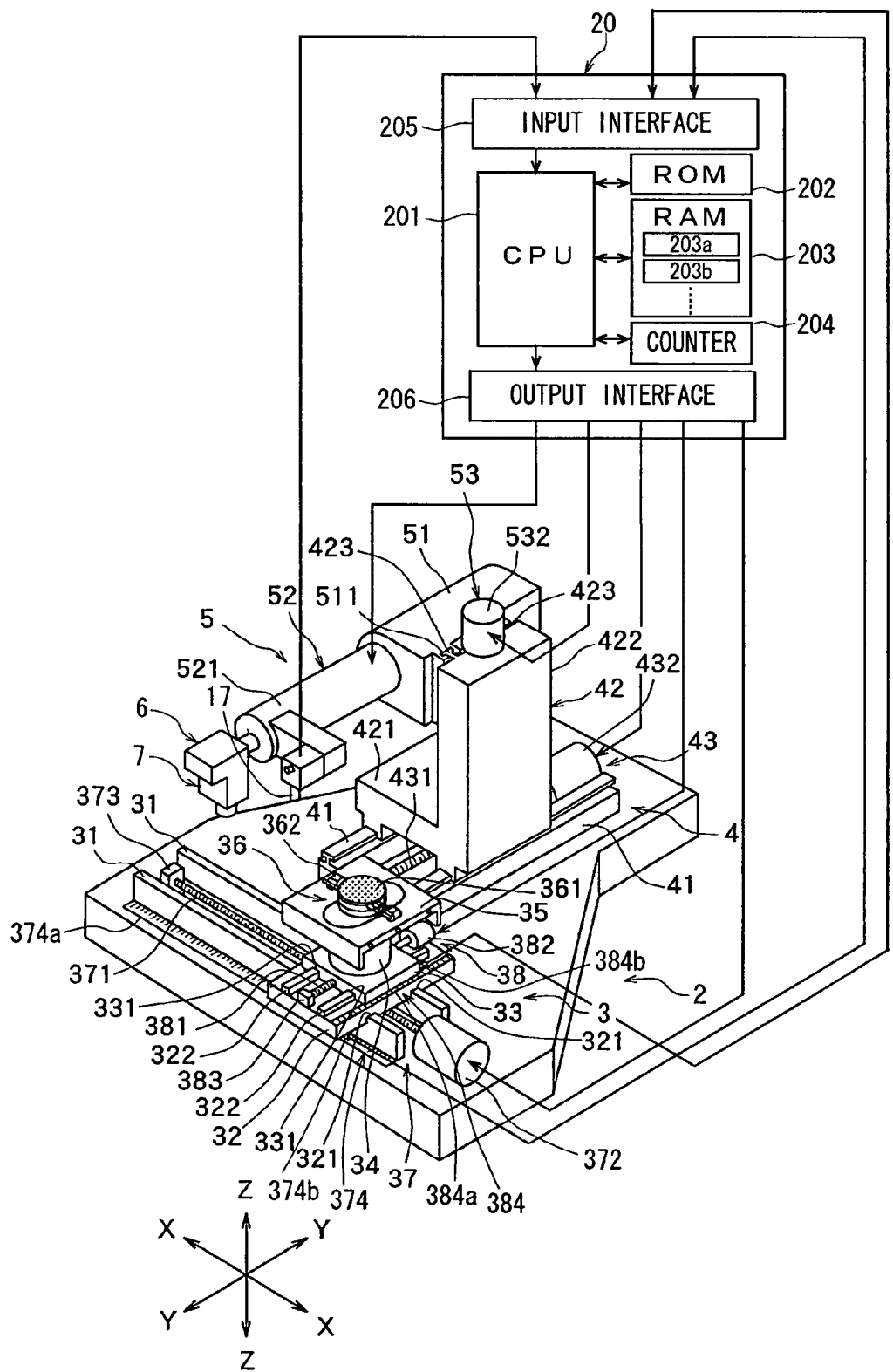
FIG. 1 is a perspective view of a laser beam processing machine constituted according to the present invention.

The laser processing method and the laser beam processing machine according to the present invention will be described in more detail with reference to the accompanying drawings. FIG. 1 is a perspective view of a laser beam processing machine constituted according to the present invention. The laser beam processing machine 1 shown in FIG. 1 comprises a stationary base 2, a chuck table mechanism 3 for holding a workpiece, which is mounted on the stationary base 2 in such a manner that it can move in a processing feed direction (X direction) indicated by an arrow X, a laser beam application unit support mechanism 4 mounted on the stationary base 2 in such a manner that it can move in an indexing-feed direction (Y direction) indicated by an arrow Y perpendicular to the direction (X direction) indicated by the arrow X, and a laser beam application unit 5 mounted to the laser beam application unit support mechanism 4 in such a manner that it can move in a direction (Z direction) indicated by an arrow Z.

The above chuck table mechanism 3 comprises a pair of guide rails 31 and 31 mounted on the stationary base 2 and arranged parallel to each other in the processing feed direction (X direction) indicated by the arrow X, a first sliding block 32 mounted on the guide rails 31 and 31 in such a manner that it can move in the processing feed direction (X direction) indicated by the arrow X, a second sliding block 33 mounted on the first sliding block 32 in such a manner that it can move in the indexing-feed direction (Y direction) indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 by a suction means that is not shown. The chuck table 36 is provided with clamps 362 for fixing an annular frame which will be described later.

The above first sliding block 32 has on the undersurface a pair of to-be-guided grooves 321 and 321 to be fitted to the above pair of guide rails 31 and 31 and on the top surface a pair of guide rails 322 and 322 formed parallel to each other in the indexing-feed direction (Y direction) indicated by the arrow Y. The first sliding block 32 constituted as described above can move along the pair of guide rails 31 and 31 in the processing feed direction (X direction) indicated by the arrow X as the to-be-guided grooves 321 and 321 are fitted to the pair of guide rails 31 and 31, respectively. The chuck table mechanism 3 in the illustrated embodiment comprises a processing feed means 37 for moving the first sliding block 32 along the pair of guide rails 31 and 31 in the processing feed direction (X direction) indicated by the arrow X. The processing feed means 37 includes a male screw rod 371 arranged between the above pair of guide rails 31 and 31 in parallel thereto and a drive source such as a pulse motor 372 and the like for rotary-driving the male screw rod 371. The male screw rod 371 is, at it's one end, rotatably supported to a bearing block 373 fixed on the above stationary base 2 and is, at the other end, transmission-coupled to the output shaft of the above pulse motor 372. The male screw rod 371 is screwed into a threaded through-hole formed in an female screw block (not shown) projecting from the undersurface of the center portion of the first sliding block 32. Therefore, by rotary-driving the male screw rod 371 in a normal direction or reverse direction with the pulse motor 372, the first sliding block 32 is moved along the guide rails 31 and 31 in the processing feed direction (X direction) indicated by the arrow X.

The laser beam processing machine 1 in the illustrated embodiment comprises a processing feed amount detection means 374 for detecting the processing feed amount of the above chuck table 36. The processing feed amount detection means 374 comprises a linear scale 374a arranged along the guide rail 31 and a read head 374b which is mounted on the first sliding block 32 and moves along the linear scale 374a together with the first sliding block 32. The read head 374b of this processing feed amount detection means 374 supplies one pulse signal for every 1 μm to a control means which will be described later in the illustrated embodiment. The control means described later counts the input pulse signals to detect the processing feed amount of the chuck table 36. When the pulse motor 372 is used as a drive source for the above processing feed means 37, the processing feed amount of the chuck table 36 can be detected by counting the drive pulses of the control means described later for outputting a drive signal to the pulse motor 372. When a servo motor is used as a drive source for the above processing feed means 37, the processing feed amount of the chuck table 36 can be detected by counting pulse signals input into the control means described later from a rotary encoder for detecting the revolution of the servo motor.

The above second sliding block 33 has on the undersurface a pair of to-be-guided grooves 331 and 331 to be fitted to the pair of guide rails 322 and 322 on the top surface of the above first sliding block 32 and can move in the indexing-feed direction (Y direction) indicated by the arrow Y when the guide grooves 331 and 331 are fitted to the pair of guide rails 322 and 322, respectively. The chuck table mechanism 3 in the illustrated embodiment comprises a first indexing-feed means 38 for moving the second sliding block 33 along the pair of guide rails 322 and 322 on the first sliding block 32 in the indexing-feed direction (Y direction) indicated by the arrow Y. The first indexing-feed means 38 includes a male screw rod 381 which is arranged parallel between the above pair of guide rails 322 and 322 in parallel and a drive source such as a pulse motor 382 and the like for rotary-driving the male screw rod 381. The male screw rod 381 is, at it's one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in an female screw block (not shown) projecting from the undersurface of the center portion of the second sliding block 33. Therefore, by rotary-driving the male screw rod 381 in a normal direction or reverse direction with the pulse motor 382, the second sliding block 33 is moved along the guide rails 322 and 322 in the indexing-feed direction (Y direction) indicated by the arrow Y.

The laser beam processing machine 1 in the illustrated embodiment comprises an indexing feed amount detection means 384 for detecting the indexing feed amount of the above second sliding block 33. This indexing feed amount detection means 384 comprises a linear scale 384a arranged along the guide rail 322 and a read head 384b which is mounted on the second sliding block 33 and moves along the linear scale 384a together with the second sliding block 33. The read head 384b of the indexing feed amount detection means 384 supplies one pulse signal for every 1 μm to the control means in the illustrated embodiment. The control means counts the input pulse signals to detect the indexing feed amount of the chuck table 36. When the pulse motor 382 is used as a drive source for the above first indexing-feed means 38, the indexing feed amount of the chuck table 36 can be detected by counting the drive pulses of the control means for outputting a drive signal to the pulse motor 382. When a servo motor is used as a drive source for the above first indexing-feed means 38, the indexing feed amount of the chuck table 36 can be detected by counting pulse signals input into the control means from a rotary encoder for detecting the revolution of the servo motor.

The above laser beam application unit support mechanism 4 comprises a pair of guide rails 41 and 41 mounted on the stationary base 2 and arranged parallel to each other in the indexing-feed direction (Y direction) indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction (Z direction) indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction (Y direction) indicated by the arrow Y. This second indexing-feed means 43 includes a male screw rod 431 arranged between the above pair of guide rails 41 and 41 in parallel thereto and a drive source such as a pulse motor 432 and the like for rotary-driving the male screw rod 431. The male screw rod 431 is, at it's one end, rotatably supported to a bearing block (not shown) fixed on the above stationary base 2 and the other end is, at the other end, transmission coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by rotary-driving the male screw rod 431 in a normal direction or reverse direction with the pulse motor 432, the movable support base 42 is moved along the guide rails 41 and 41 in the indexing-feed direction (Y direction) indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction (Z direction) indicated by the arrow Z when the guide grooves 511 and 511 are fitted to the above guide rails 423 and 423, respectively.

The laser beam application unit 5 in the illustrated embodiment comprises a moving means 53 for moving the unit holder 51 along the pair of guide rails 423 and 423 in the direction (Z direction) indicated by the arrow Z. The moving means 53 includes a male screw rod (not shown) arranged between the above pair of guide rails 423 and 423 and a drive source such as a pulse motor 532 and the like for rotary-driving the male screw rod. By rotary-driving the male screw rod (not shown) in a normal direction or reverse direction with the pulse motor 532, the unit holder 51 and the laser beam application means 52 are moved along the guide rails 423 and 423 in the direction (Z direction) indicated by the arrow Z. In the illustrated embodiment, the laser beam application means 52 is moved up by driving the pulse motor 532 in the normal direction and moved down by driving the pulse motor 532 in the reverse direction.

Figure 2:
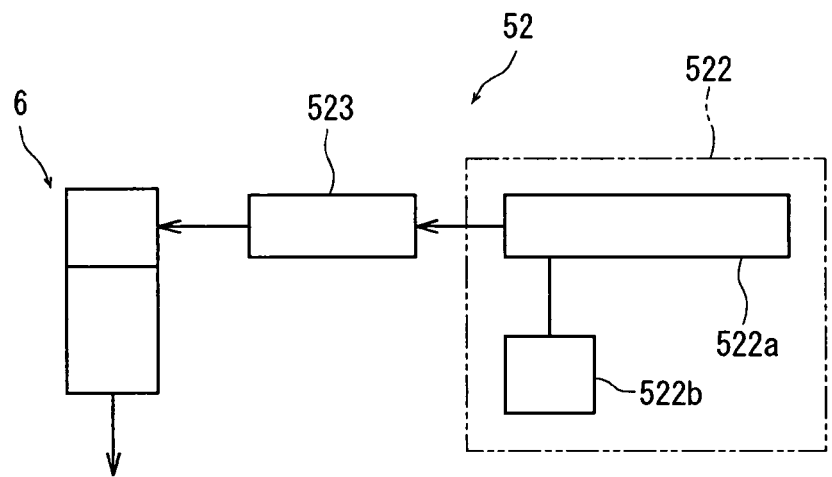
FIG. 2 is a block diagram of a laser beam application means provided in the laser beam processing machine shown in FIG. 1.

The illustrated laser beam application means 52 includes a cylindrical casing 521 secured to the above unit holder 51 and extending substantially horizontally. The laser beam application means 52 comprises a pulse laser beam oscillation means 522 and a transmission optical system 523 installed in the casing 521 as shown in FIG. 2 and a processing head 6 for applying a pulse laser beam oscillated by the pulse laser beam oscillation means 522 to the workpiece held on the above chuck table 36, which is attached to the end of the casing 521. The above pulse laser beam oscillation means 522 comprises a pulse laser beam oscillator 522a composed of a YAG laser oscillator or YVO4 laser oscillator and a cyclic frequency setting means 522b connected to the pulse laser beam oscillator 522a. The transmission optical system 523 includes a suitable optical element such as a beam splitter.

Figure 3:
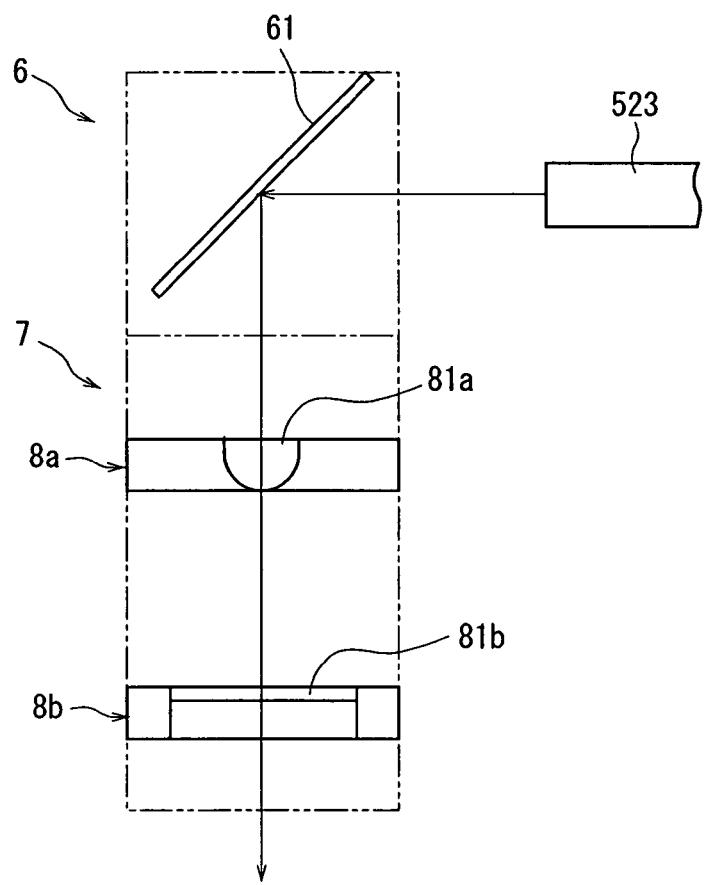
FIG. 3 is a explanatory diagram of a processing head comprising a condenser constituting the laser beam application means shown in FIG. 2.
Figure 4:
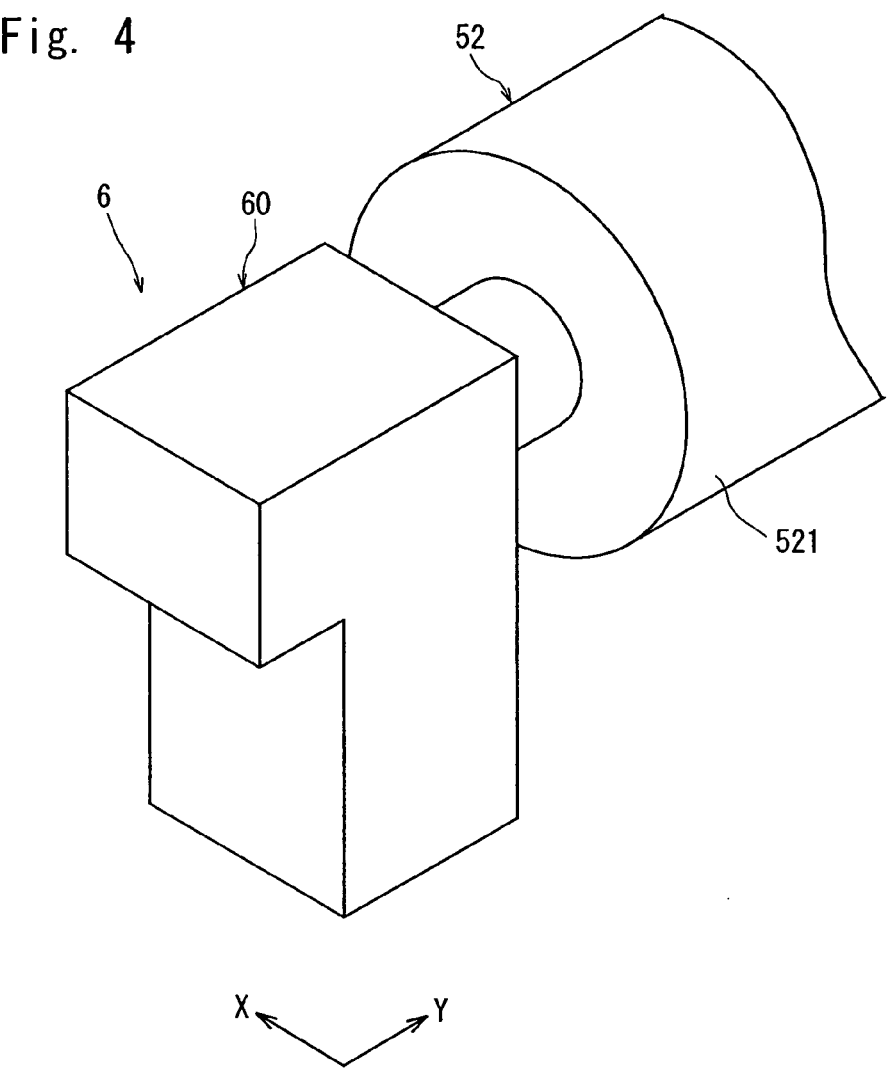
FIG. 4 is a perspective view of the processing head shown in FIG. 3.

The above processing head 6 comprises a direction changing mirror 61 and a condenser 7 as shown in FIG. 3. The direction changing mirror 61 changes the direction of a pulse laser beam oscillated by the above pulse laser beam oscillation means 522 and applied through the transmission optical system 523 toward the condenser 7. The condenser 7 in the illustrated embodiment comprises a first cylindrical lens unit 8a having a first cylindrical lens 81a, a second cylindrical lens unit 8b having a second cylindrical lens 81b whose converging direction is perpendicular to that of the first cylindrical lens 81a, and an interval control mechanism for controlling the interval between the first cylindrical lens unit 8a and the second cylindrical lens unit 8b, which will be described later. The above direction changing mirror 61, the first cylindrical lens unit 8a, the second cylindrical lens unit 8b and the interval control mechanism are installed in a processing head housing 60 mounted to the end of the above casing 521 as shown in FIG. 4.

Figure 5:
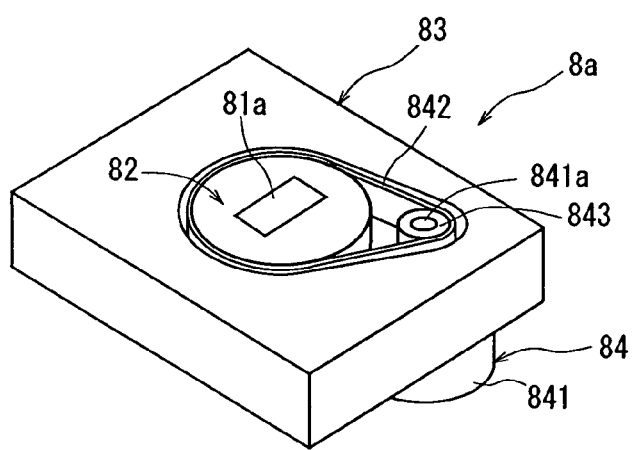
FIG. 5 is a perspective view of a first cylindrical lens unit constituting the condenser of the processing head shown in FIG. 3.

The above first cylindrical lens unit 8a will be described with reference to FIGS. 5 to 7. FIG. 5 is a perspective view of the first cylindrical lens unit 8a, and FIG. 6 is an exploded perspective view of the first cylindrical lens unit 8a shown in FIG. 5.

Figure 6:
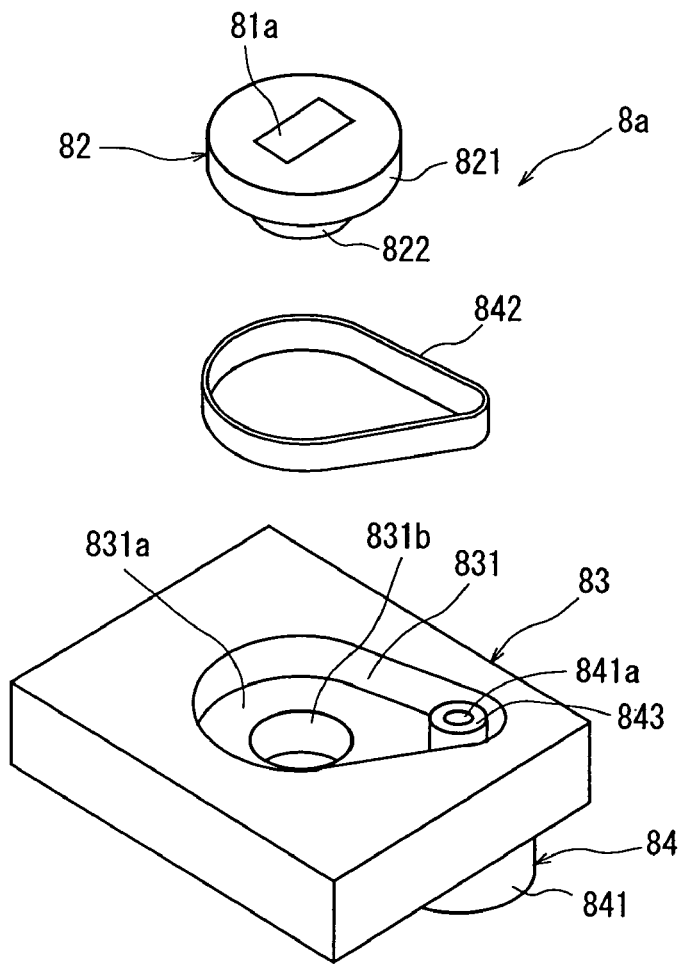
FIG. 6 is an exploded perspective view of the constituent members of the first cylindrical lens unit shown in FIG. 5.

The first cylindrical lens unit 8a shown in FIG. 5 and FIG. 6 comprises the first cylindrical lens 81a, a lens holding member 82 for holding the first cylindrical lens 81a, and a frame 83 for holding the lens holding member 82.

Figure 7:
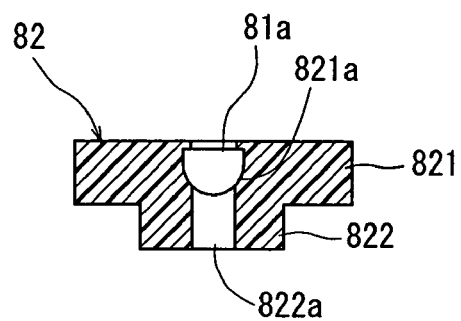
FIG. 7 is a sectional view of a lens holding member holding a first cylindrical lens constituting the first cylindrical lens unit shown in FIG. 5.

The first cylindrical lens 81a is a convex lens having a semicircular section as shown in FIG. 7. The focal distance (f1) of this first cylindrical lens 81a is set to 80 mm in the illustrated embodiment. The lens holding member 82 for holding the first cylindrical lens 81a is circular and made of a synthetic resin in the illustrated embodiment. This lens holding member 82 consists of a lens holding portion 821 and a rotary shaft portion 822 which projects from the center portion of the undersurface of the lens holding portion 821. A lens mating hole 821a is formed in the lens holding portion 821, and the first cylindrical lens 81a is fitted and held in this lens fitting hole 821a. A laser beam through-hole 822a connecting to the lens fitting hole 821a in the lens holding portion 821 is formed in the rotary shaft portion 822 in an axial direction.

The frame 83 for holding the above lens holding member 82 is rectangular as shown in FIG. 6, and a concavity 831 for accepting the lens holding portion 821 of the above lens holding member 82 is formed in the top surface of the frame 83. An axial hole 831b to be rotatably fitted to the rotary shaft portion 822 of the above lens holding member 82 is formed in the bottom wall 831a of the concavity 831. The lens holding portion 821 of the above lens holding member 82 is set in the concavity 831 of the frame 83 constituted as described above, and the rotary shaft portion 822 is fitted in the axial hole 831b to mount the lens holding portion 821 in such a manner that it can turn with the optical axis of the laser beam passing through the first cylindrical lens 81a as the center thereof.

The first cylindrical lens unit 8a in the illustrated embodiment comprises a lens rotating means 84 for rotating the above lens holding member 82 with the rotary shaft portion 822 as the center thereof. The lens rotating means 84 comprises a pulse motor 841 and an endless belt 842 in the illustrated embodiment. The pulse motor 841 is mounted on the undersurface of the above frame 83 and its drive shaft 841a projects into the concavity 831. A pulley 843 is fitted onto the drive shaft 841a, and the endless belt 842 is put round the pulley 843 and the lens holding portion 821 of the above lens holding member 82. Therefore, by driving the pulse motor 841 in a normal direction or reverse direction, the lens holding member 82 is rotated in the direction by the pulley 943 and the endless belt 942 with the rotary shaft portion 822 as the center thereof. This lens rotating means 84 functions as a focal spot rotating means for rotating an elliptic focal spot formed by a focal spot changing means composed of the first cylindrical lens 81a, the second cylindrical lens 81b and the interval control mechanism 10 with the optical axis as the center thereof as will be described later.

Figure 8:
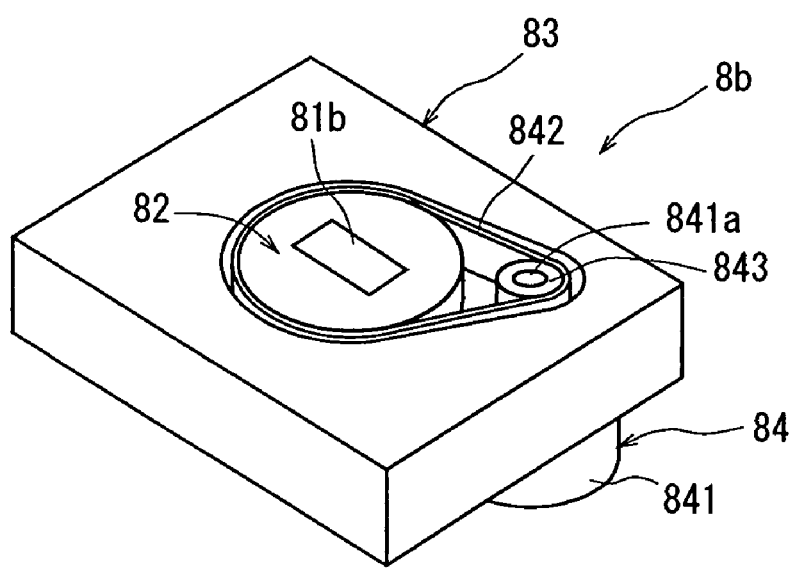
FIG. 8 is a perspective view of a second cylindrical lens unit constituting the condenser of the processing head shown in FIG. 3.

A description is subsequently given of the second cylindrical lens unit 8b with reference to FIG. 8. Since the second cylindrical lens unit 8b shown in FIG. 8 is substantially the same as the first cylindrical lens unit 8a in constitution except for the focal distance of the second cylindrical lens 81b and that the second cylindrical lens 81b is positioned such that its converging direction becomes perpendicular to that of the first cylindrical lens 81a, the same members are given the same reference symbols and their descriptions are omitted. The focal distance (f2) of the second cylindrical lens 81b of the second cylindrical lens unit 8b is set to 40 mm in the illustrated embodiment.

Figure 9:
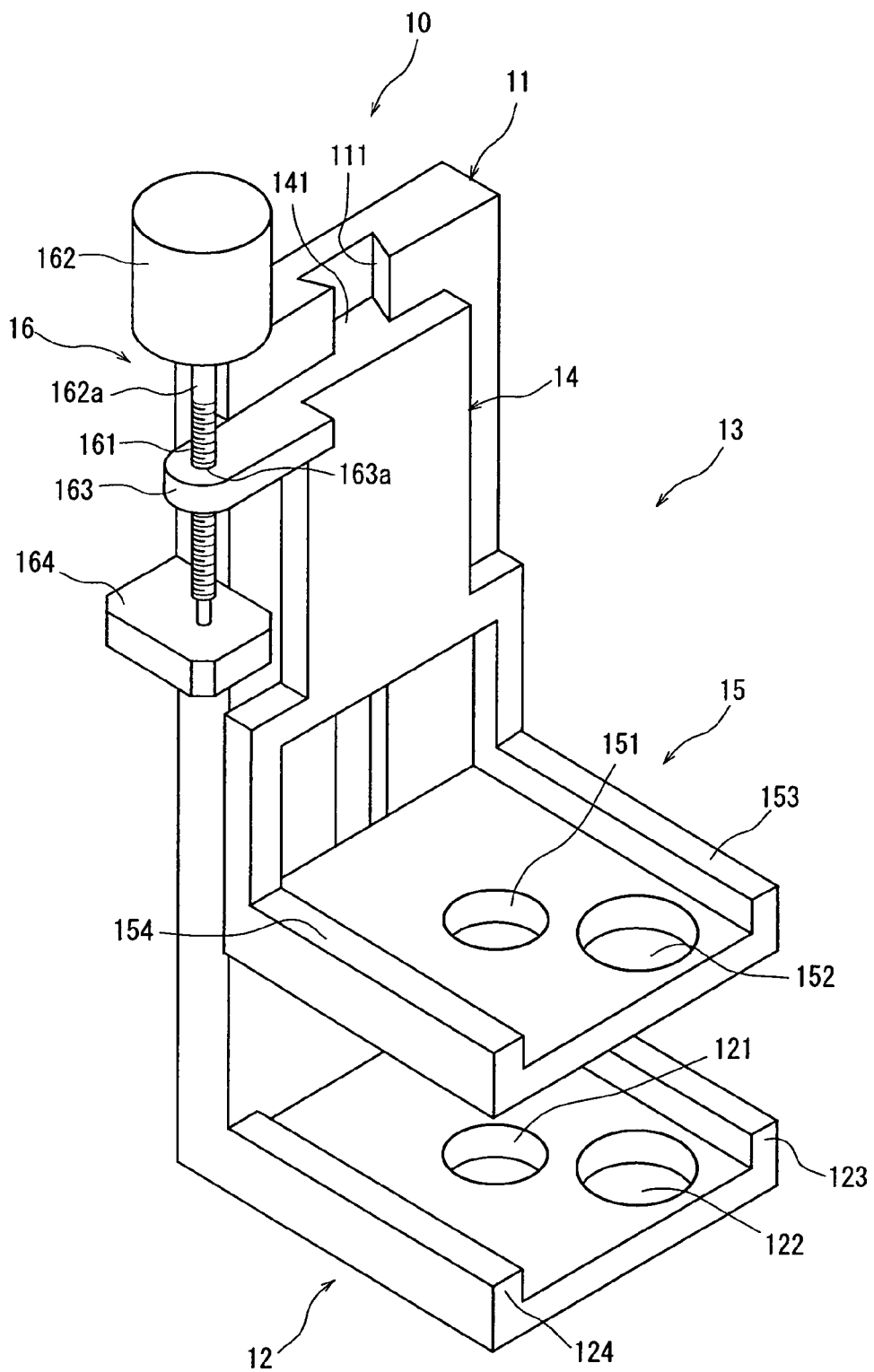
FIG. 9 is a perspective view of an interval control mechanism for controlling the interval between the first cylindrical lens unit and the second cylindrical lens unit provided in the laser beam processing machine shown in FIG. 1.

The first cylindrical lens unit 8a and the second cylindrical lens unit 8b constituted as described above are set in the interval control mechanism 10 shown in FIG. 9. A description is subsequently given of the interval control mechanism 10.

The interval control mechanism 10 shown in FIG. 9 comprises a support substrate 11, a first support table 12 installed at the lower end of the support substrate 11, and a second support table 13 arranged such that it can move in the vertical direction along the front surface of the support substrate 11.

A guide groove 111 is formed in the center portion of the front surface of the support substrate 11 in the vertical direction. A hole 121 through which a laser beam passes is formed in the center portion of the first support table 12, and a hole 122 which accepts the pulse motor 841 constituting the above lens rotating means 84 of the above second cylindrical lens unit 8b is formed in the first support table 12. Positioning rails 123 and 124 extending at a right angle from the front surface of the support substrate 11 are formed at both side ends of the first support table 12. The interval between the positioning rails 123 and 124 is set to a size corresponding to the width of the frame 83 constituting the above second cylindrical lens unit 8b.

The above second support table 13 is composed of a support portion 14 and a table portion 15 installed at the lower end of the support portion 14. The support portion 14 has on the back a to-be-guided rail 141 to be fitted to the guide groove 111 formed in the above support substrate 11. When this to-be-guided rail 141 is fitted to the guide groove 111, the second support table 13 is supported to the support substrate 11 in such a manner that it can move along the guide groove 111 in the vertical direction. The above table portion 15 projects from the front surface of the support portion 14 at a right angle. A hole 151 through which a laser beam passes is formed in the center portion of this table portion 15, and a hole 152 which accepts the pulse motor 841 constituting the above lens rotating means 84 of the above first cylindrical lens unit 8a is formed in the above table portion 15. Positioning rails 153 and 154 extending at a right angle from the front surface of the support substrate 11 are formed at both side ends of the table portion 15. The interval between the positioning rails 153 and 154 is set to a size corresponding to the width of the frame 83 constituting the above first cylindrical lens unit 8a.

The interval control mechanism 10 in the illustrated embodiment comprises a moving means 16 for moving down the second support table 13 along the guide groove 111 of the support substrate 11. The moving means 16 includes a male screw rod 161 arranged in the vertical direction on one side of the support portion 14 of the second support table 13 and a pulse motor 162 for rotary-driving the male screw rod 161. The male screw rod 161 is screwed into a threaded screw hole 163a formed in a movable plate 163 fixed to the upper end of the support portion 14, and the lower end of the male screw rod 161 is rotatably journaled to a bearing 164 fixed to the side surface of the support substrate 11. The pulse motor 162 is attached to the support substrate 11, and its drive shaft 162a is connected to the upper end of the male screw rod 161. Therefore, the second support table 13 is moved down by rotary-driving the male screw rod 161 in the normal direction with the pulse motor 162 and moved up by rotary-driving the male screw rod 161 in the reverse direction. The moving means 16 can suitably control the interval between the table portion 15 of the second support table 13 and the first support table 12 by driving the pulse motor 162 in the normal direction or reverse direction.

Figure 10:
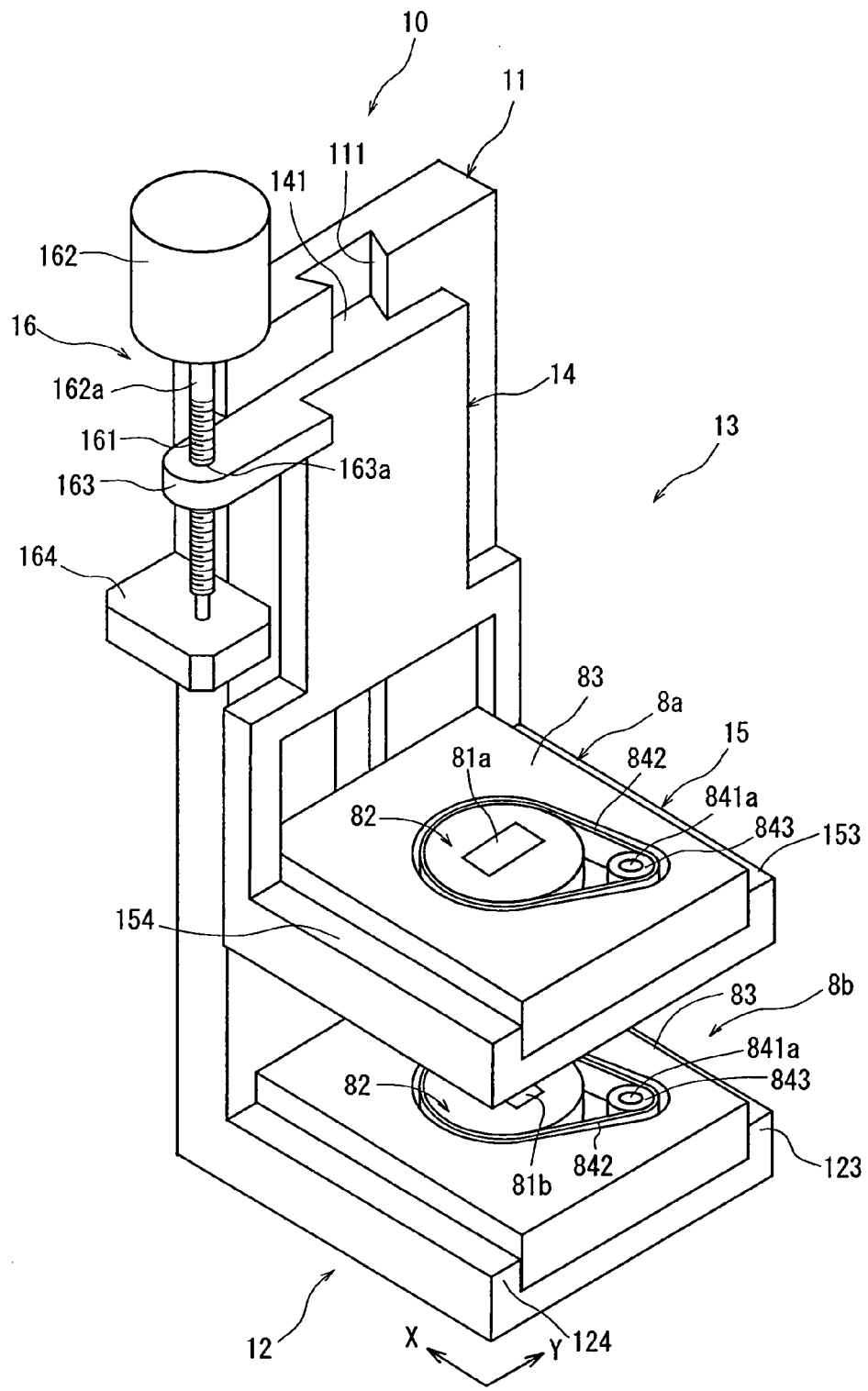
FIG. 10 is a perspective view showing the state that the first cylindrical lens unit and the second cylindrical lens unit have been set in the interval control mechanism shown in FIG. 9.

The above second cylindrical lens unit 8b is placed on the first support table 12 of the interval control mechanism 10 constituted as described above as shown in FIG. 10. That is, the frame 83 of the second cylindrical lens unit 8b is placed between the positioning rails 123 and 124 of the first support table 12. The second cylindrical lens unit 8b placed at a predetermined position on the first support table 12 is fixed on the first support table 12 by a suitable fixing means that is not shown. The converging direction of the second cylindrical lens 81b of the second cylindrical lens unit 8b placed on the first support table 12 is set to the Y direction in FIG. 10.

The above first cylindrical lens unit 8a is placed on the table portion 15 of the second support table 13 of the interval control mechanism 10. That is, the frame 83 of the first cylindrical lens unit 8a is placed between the positioning rails 153 and 154 of the table portion 15 constituting the second support table 13. The first cylindrical lens unit 8a placed at a predetermined position on the table portion 15 of the second support table 13 is fixed on the table portion 15 of the second support table 13 by a suitable fixing means that is not shown. The converging direction of the first cylindrical lens 81a of the first cylindrical lens unit 8a placed on the table portion 15 of the second support table 13 is set to the X direction in FIG. 10.

Returning to FIG. 1, image pick-up means 17 for detecting the area to be processed by the above laser beam application means 52 is mounted to the front end portion of the casing 521 constituting the above laser beam application means 52. This image pick-up means 17 comprises an image pick-up device (CCD) and the like and supplies an image signal to the control means 20.

The control means 20 is composed of a computer which comprises a central processing unit (CPU) 201 for carrying out arithmetic processing based on a control program, a read-only memory (ROM) 202 for storing the control program, etc., a read/write random access memory (RAM) 203 for storing data on the design values of the workpiece and the results of operations both of which will be described later, a counter 204, an input interface 205 and an output interface 206. Detection signals from the above processing feed amount detection means 374, the indexing feed amount detection means 384 and the image pick-up means 17 are applied to the input interface 205 of the control means 20. Control signals are output from the output interface 206 of the control means 20 to the above pulse motor 372, the pulse motor 382, the pulse motor 432, the pulse motor 532, the laser beam application means 52, the pulse motor 841 constituting the lens rotating means 84 of the first cylindrical lens unit 8a, the pulse motor 841 constituting the lens rotating means 84 of the second cylindrical lens unit 8b, and the pulse motor 162 of the moving means 16 constituting the interval control mechanism 10. The above random access memory (RAM) 203 has a first storage area 203a for storing data on the design values of the processing lines formed on the workpiece which will be described later, a second storage area 203b for storing data on the detection values which will be described hereinafter, and other storage areas.

The laser beam processing machine in the illustrated embodiment is constituted as described above and its function will be described hereinunder.

The shape of the focal spot of a laser beam applied by the above-described laser beam application means 52 will be described with reference to FIGS. 11(a) to 11(c) and FIGS. 12(a) to 12(c).

When the interval (d) between the first cylindrical lens 81a and the second cylindrical lens 81b is set to 40 mm as shown in FIGS. 11(a) and 11(b), as the focal distance (f1) of the first cylindrical lens 81a is set to 80 mm in the illustrated embodiment, the focal point P1 of a laser beam L focused by the first cylindrical lens 81a is located 40 mm below the second cylindrical lens unit 8b as shown in FIG. 11(a). Meanwhile, as the focal distance (f2) of the second cylindrical lens 81b is set to 40 mm in the illustrated embodiment, the focal point P2 of the laser beam L focused by the second cylindrical lens 81b is located 40 mm below the second cylindrical lens unit 8b as shown in FIG. 11(b). Thus, the focal point P1 and the focal point P2 are existent at the same position. As a result, the laser beam L having a circular section applied to the first cylindrical lens 81a is converged by the first cylindrical lens 81a in the X direction and further by the second cylindrical lens 81b in the Y direction, whereby a focal spot S1 having a circular section is formed at the focal points P1 and P2 as shown in the enlarged view of FIG. 11(c). Therefore, when the workpiece is set at the position of the focal points P1 and P2, it can be processed by means of the focal spot S1 having a circular section.

When the interval (d) between the first cylindrical lens 81a and the second cylindrical lens 81b is set to 30 mm as shown in FIGS. 12(a) and 12(b), as the focal distance (f1) of the first cylindrical lens 81a is set to 80 mm, the focal point P1 of the laser beam L focused by the first cylindrical lens 81a is located 50 mm below the second cylindrical lens unit 8b as shown in FIG. 12(a). Meanwhile, as the focal distance (f2) of the second cylindrical lens 81b is set to 40 mm, the focal point P2 of the laser beam L focused by the second cylindrical lens

Figure 12:
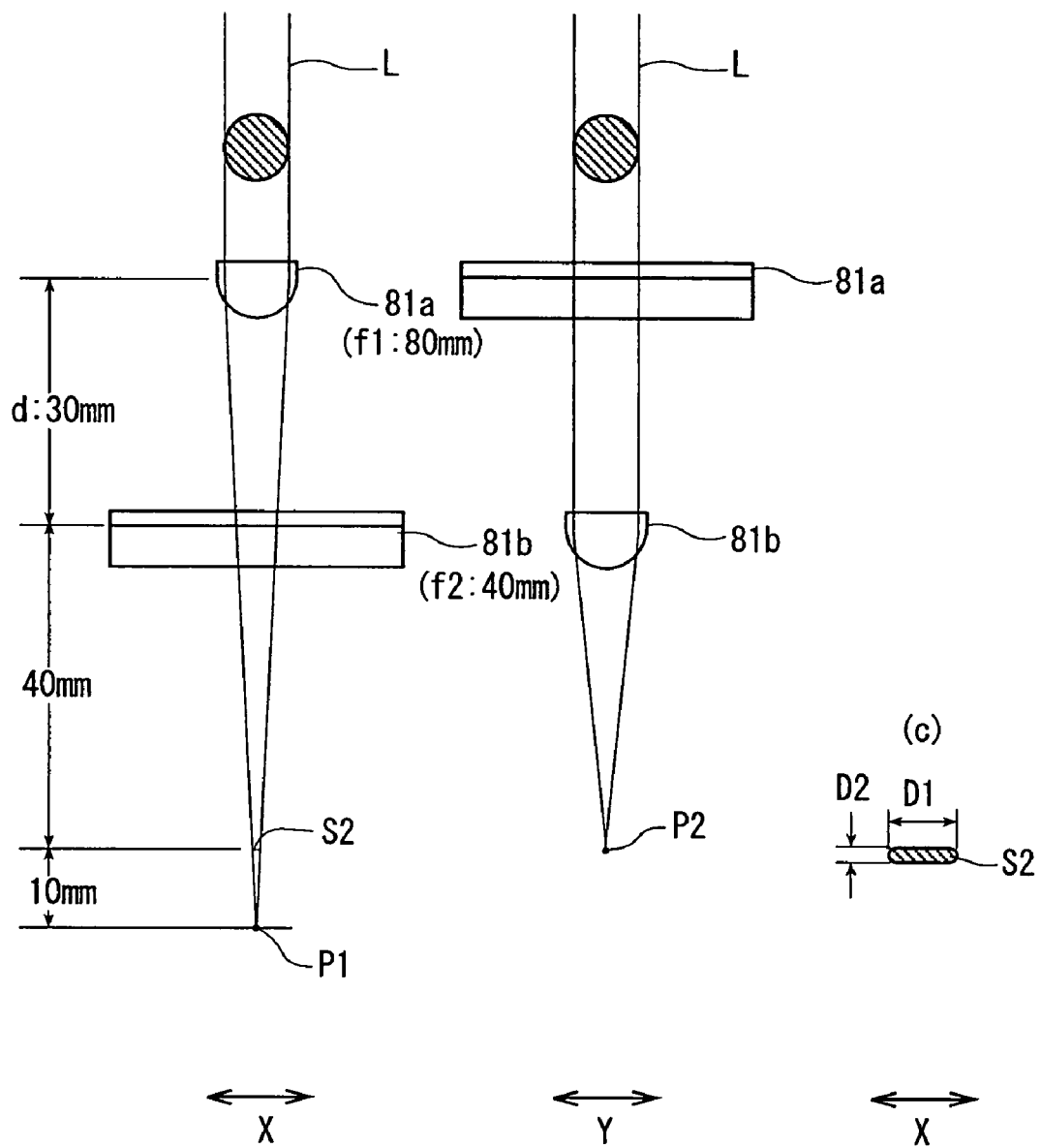
FIGS. 12(a) to 12(c) are diagrams showing the state that a focal spot having an elliptic section is formed by the first cylindrical lens and the second cylindrical lens.

81b is located 40 mm below the second cylindrical lens unit 8b as shown in FIG. 12(*b*). Therefore, as the laser beam L converged by the first cylindrical lens 81a does not reach the focal point P1 in the X direction at the position of the focal point P2 as shown in FIG. 12(*a*), a focal spot S2 at the position of the focal point P2 has an elliptic section as shown in the enlarged view of FIG. 12(*c*). The ratio of the long axis D1 to the short axis D2 of the elliptic focal spot S2 can be controlled by changing the interval (d) between the first cylindrical lens 81a and the second cylindrical lens 81b. Therefore, when the workpiece is set at the position of the focal point P2, it can be processed by means of the focal spot S2 having an elliptic section.

The interval control mechanism 10 for controlling the interval between the first cylindrical lens 81a and the second cylindrical lens 81b functions as a focal spot changing means for changing the shape of the focal spot between an elliptic spot and a circular spot. The lens rotating means 84 for rotating the lens holding member 82 of the first cylindrical lens unit 8a with the rotary shaft portion 822 as the center thereof and the lens rotating means 84 for rotating the lens holding member 82 of the second cylindrical lens unit 8b with the rotary shaft portion 822 as the center thereof function as focal spot rotating means for rotating the elliptic focal spot formed by the focal spot changing means with the optical axis as the center thereof.

A description is subsequently given of the method of forming a laser-processed groove in the workpiece by means of the focal spot S1 having a circular section shown in FIGS. 11(*a*) to 11(*c*) and the focal spot S2 having an elliptic section shown in FIGS. 12(*a*) to 12(*c*).

Figure 13:
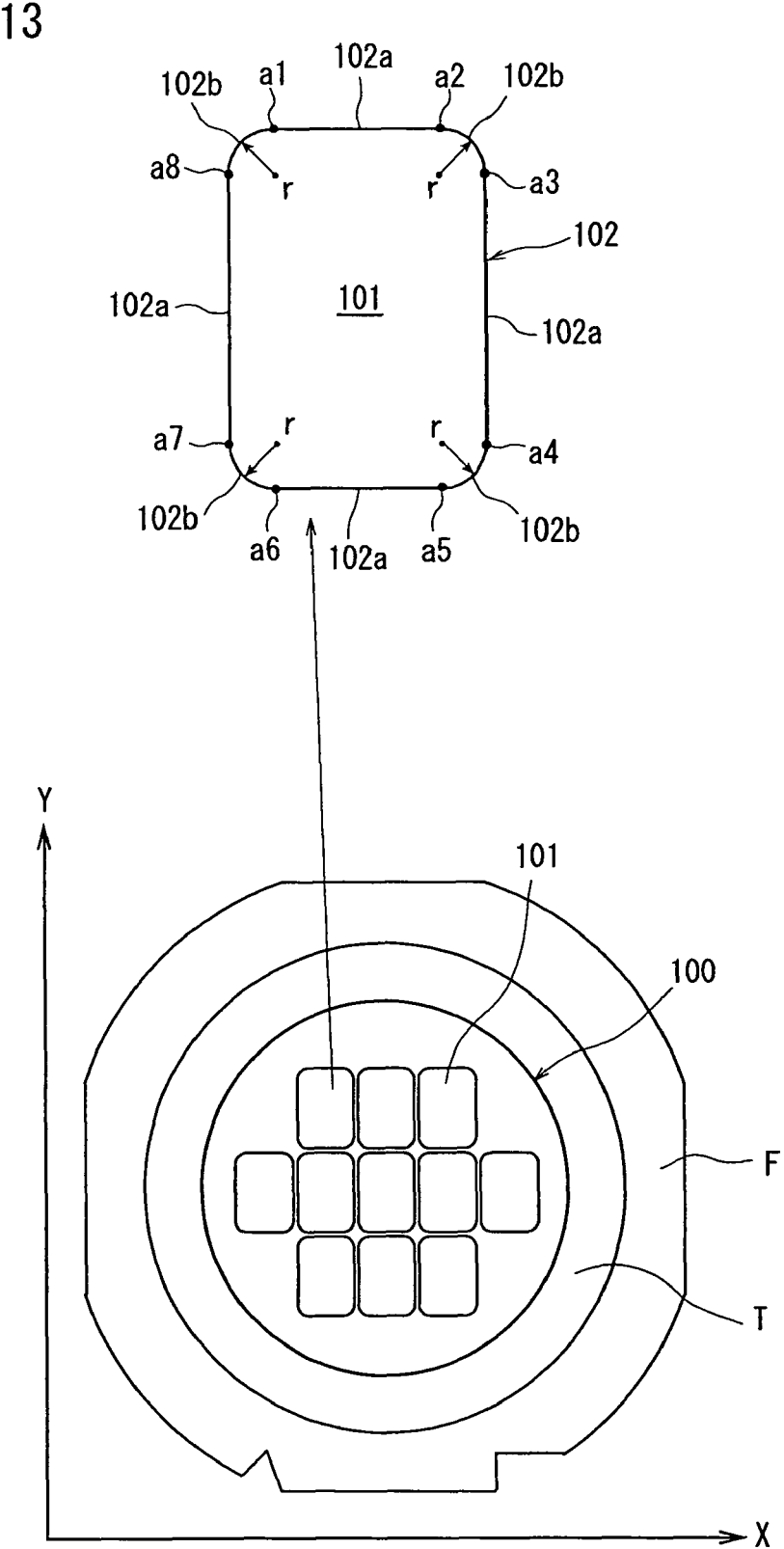
FIG. 13 is a plane view showing the state that a wafer has been affixed to the front surface of a protective tape mounted on an annular frame as a workpiece to be processed by the laser beam processing machine shown in FIG. 1.

FIG. 13 shows the state that a wafer 100 as the workpiece is affixed to the front surface of a protective tape T mounted on an annular frame F. A plurality of rectangular devices 101 are formed on the front surface of the wafer 100. Each device 101 is sectioned by a processing line 102 consisting of four linear portions 102a and four curved portions 102b having a predetermined radius r. Data on the X and Y coordinate values (design values) of intersections a1 to a8 between the linear portions 102a and the curved portions 102b of the processing lines 102 formed on the front surface of the wafer 100 are stored in the first storage area 203a of the random access memory (RAM) 203 of the above control means 20.

As shown in FIG. 13, the protective tape T side of the workpiece W supported to the annular frame F through the protective tape T is placed on the chuck table 36 of the laser beam processing machine shown in FIG. 1. The workpiece W is suction-held on the chuck table 36 through the protective tape T by activating the suction means that is not shown). The annular frame F is fixed by the clamps 362. The chuck table 36 suction holding the workpiece W is positioned right below the image pick-up means 17 by the processing feed means 37. After the chuck table 36 is positioned right below the image pick-up means 17, the workpiece W on the chuck table 36 is in the state that it is positioned at the coordinate position shown in FIG. 13.

Figure 14:
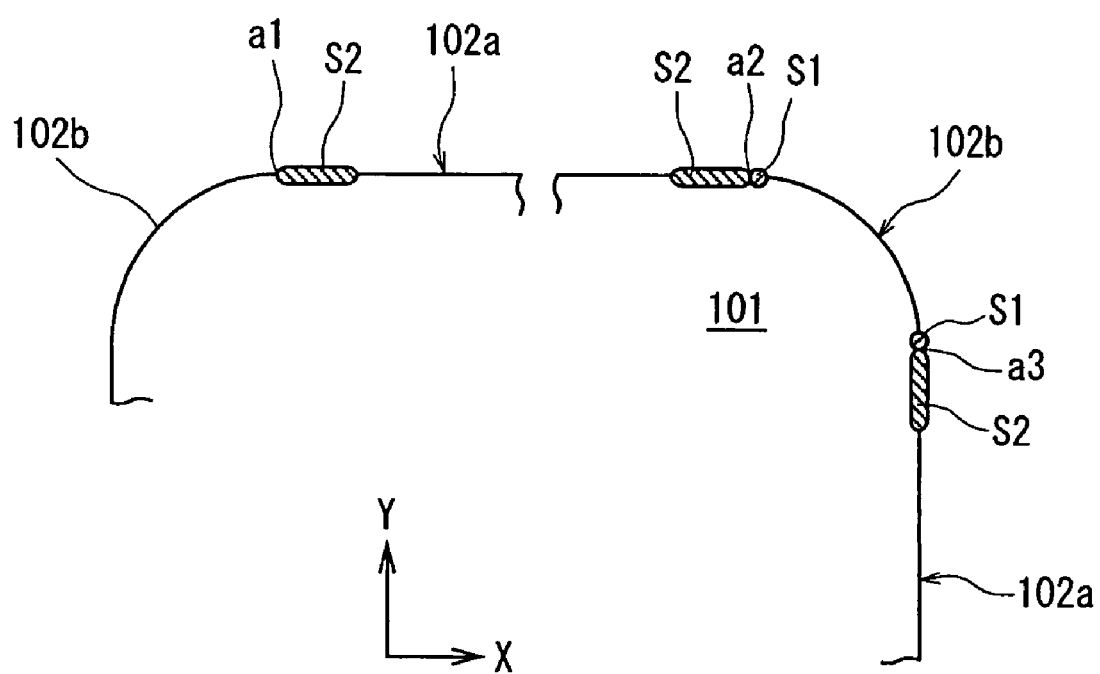
FIG. 14 is a diagram showing the state that the laser processing method of the present invention has been carried out along processing lines having linear portions and curved portions formed on the wafer as the workpiece shown in FIG. 13.

As a processing start position, for example, the positional is detected by the image pick-up means 17 and the control means 20. The chuck table 36 is then moved to locate the positional right below (processing position) the condenser 7 of the laser beam application means 52. Thereafter, the control means 20 activates the interval control mechanism 10 to set the interval (d) between the first cylindrical lens 81a and the second cylindrical lens 81b to the state shown in FIGS. 12(*a*) to 12(*c*) so as to make the elliptic focal spot S2 as shown in FIG. 14 because the section between the current positional and the position a2 is a linear portion 102a, and activates the lens rotating means 84 of the first cylindrical lens unit 8a and the lens rotating means 84 of the second cylindrical lens unit 8b in sync with each other to steer the long axis D1 of the elliptic focal spot S2 in the X direction and position it along the linear portion 102a from the current positional to the position a2. Then, the control means 20 controls the laser beam application means 52 to apply a pulse laser beam of a wavelength having absorptivity for the wafer 100 from the condenser 7 and also activates the processing feed means 37 to move the chuck table 36 in order to move the wafer 100 from the positional to the position a2.

Figure 11:
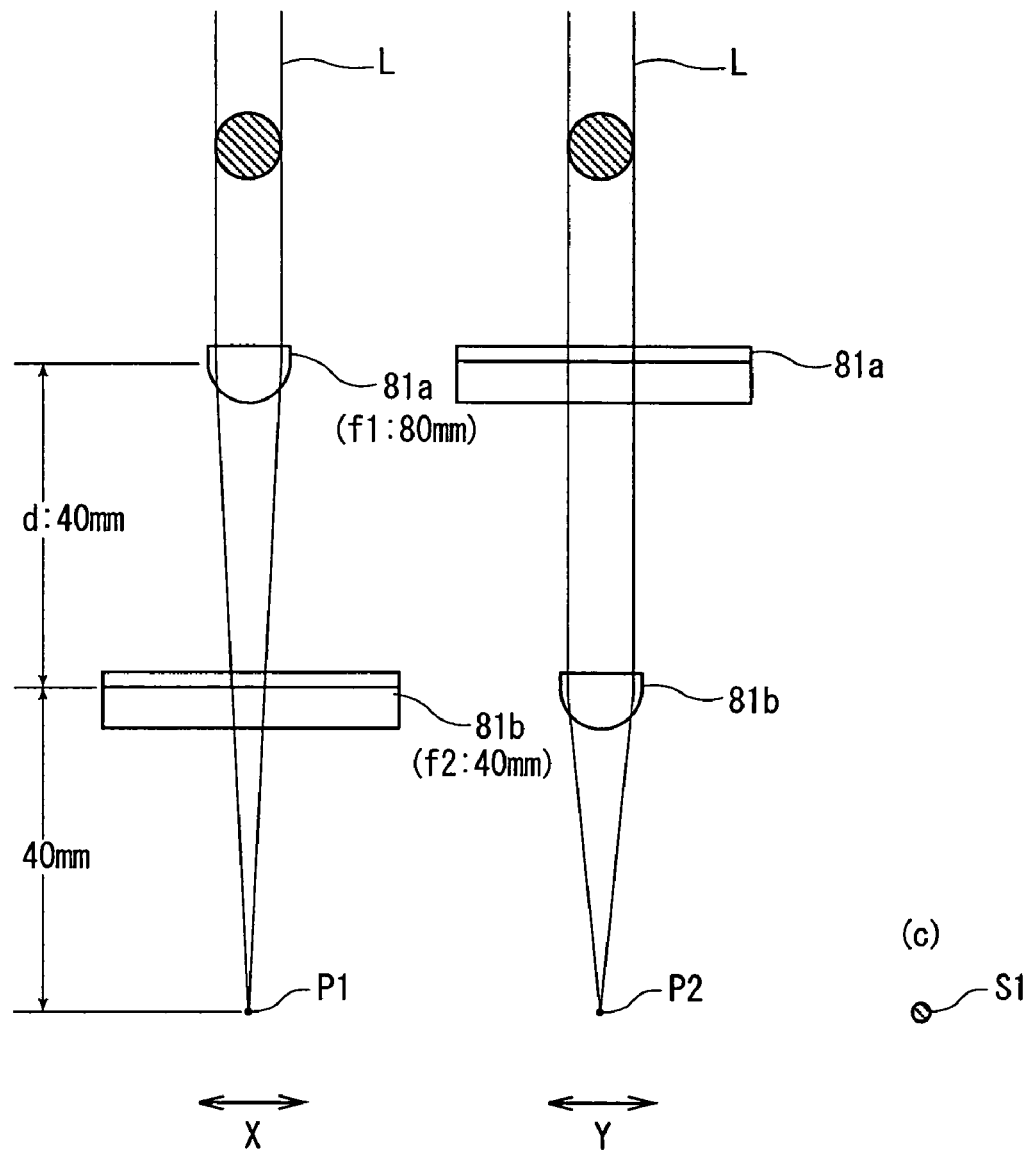
FIGS. 11(a) to 11(c) are diagrams showing the state that a focal spot having a circular section is formed by a first cylindrical lens and a second cylindrical lens.

After the wafer 100 is moved from the positional to the position a2 as described above, the control means 20 activates the pulse motor 162 of the moving means 16 constituting the interval control mechanism 10 to set the interval (d) between the first cylindrical lens 81a and the second cylindrical lens 81b to the state shown in FIGS. 11(*a*) to 11(*c*) so as to make the circular focal spot S1 as shown in FIG. 14 because the section from the position a2 to the position a3 is a curved portion 102b. Then, the control means 20 activates the processing feed means 37 and the first indexing-feed means 38 to move the chuck table 36 so as to move the wafer 100 from the position a2 to the position a3.

After the wafer 100 is moved from the position a2 to the position a3, the control means 20 sets the interval (d) between the first cylindrical lens 81a and the second cylindrical lens 81b to the state shown in FIGS. 12(*a*) to 12(*c*) to makes the elliptic focal spot S2 as shown in FIG. 14, and turns the lens rotating means 84 of the first cylindrical lens unit 8a and the lens rotating means 84 of the second cylindrical lens unit 8b at 90° in sync with each other so as to steer the long axis D1 of the elliptic focal spot S2 in the Y direction and position it along the linear portion 102a from the position a3 to the position a4. Rotating the lens rotating means 84 of the first cylindrical lens unit 8a and the lens rotating means 84 of the second cylindrical lens unit 8b at 90° in sync with each other can be carried out while the curved portion 102b from the position a2 to the position a3 is processed. When the position a3 is reached, the interval (d) between the first cylindrical lens 81a and the second cylindrical lens 81b is set to the state shown in FIGS. 12(*a*) to 12(*c*) to make the elliptic focal spot S2 as shown in FIG. 14. When rotating the lens rotating means 84 of the first cylindrical lens unit 8a and the lens rotating means 84 of the second cylindrical lens unit 8b at 90° in sync with each other is carried out while the curved portion 102b from the position a2 to the position a3 is processed, it is possible to proceed smoothly to processing from the position a3. The control means 20 activates the first indexing-feed means 38 to move the chuck table 36 so as to move the wafer 100 along the linear portion 102 from the position a3 to the position a4. After the wafer 100 is moved from the position a3 to the position a4, the control means 20 sets the interval (d) between the first cylindrical lens 81a and the second cylindrical lens 81b to the state shown in FIGS. 11(*a*) to 11(*c*) to make the circular focal spot S1 and activates the processing feed means 37 and the first indexing-feed means 38 to move the chuck table 36 so as to move the wafer 100 along the curved portion 102b from the position a4 to the position a5.

Thereafter, the processing of the linear portion from the position a5 to the position a6, the processing of the curved portion from the position a6 to the position a7 and the processing of the linear portion from the position a7 to the position a8 are carried out. As a result, a groove is formed in the wafer 100 along the processing line 102 for sectioning the device 101. By carrying out the above processing along the processing lines 102 for sectioning all the devices 101 formed on the wafer 100, the wafer 100 is divided into individual devices 101.

The processing conditions for the above laser processing are set as follows, for example.

Light source of laser beam: YVO4 laser or YAG laser
Wavelength: 355 nm
Cyclic frequency: 50 to 100 kHz
Average output: 4 W
Feed rate: 50 to 300 mm/sec
Circular spot diameter: 10 μm
Elliptic spot diameter: 100 μm for long axis (D1), 10 μm for short axis (D2)

Since the linear portions 102a of the processing lines 102 are processed by means of the elliptic focal spot S2 by positioning the long axis D1 of the elliptic focal spot S2 along the linear portions 102 in the illustrated embodiment, a groove having a width corresponding to the short axis (D2) can be formed. Since the curved portions 102b of the processing lines 102 are processed by means of the circular focal spot S1, a groove having a width corresponding to the diameter of the circular spot can be formed along the curved portions 102b of the processing lines 102 accurately without projecting from the processing area.

What is claimed is:

1. A method of carrying out laser processing along processing lines having linear portions and curved portions formed on a workpiece by using a laser beam processing machine comprising a chuck table for holding the workpiece, a laser beam application means for applying a laser beam to the workpiece held on the chuck table, a processing feed means for moving the chuck table and the laser beam application means relative to each other in a processing feed direction (X direction), and an indexing-feed means for moving the chuck table and the laser beam application means relative to each other in an indexing-feed direction (Y direction) perpendicular to the processing feed direction (X direction), and a condenser in the laser beam application means for converging a laser beam oscillated from a laser beam oscillation means for oscillating a laser beam, which comprises a focal spot changing means for changing the shape of a focal spot between an elliptic spot and a circular spot, wherein the method comprises the step of:

activating the processing feed means and the indexing-feed means to move the processing lines formed on the workpiece to the application position of a laser beam, and activating the focal spot changing means to make an elliptic focal spot and to position the long axis of the elliptic focal spot along the linear portions of the processing lines when the linear portions of the processing lines are located at the application position of a laser beam and to make a circular focal spot when the curved portions of the processing lines are located at the application position of the laser beam.

2. The method according to claim 1, wherein the workpiece is a wafer having a plurality of devices on the front surface which are sectioned by processing lines having linear portions and curved portions and a laser beam is applied along the processing lines.

3. A laser beam processing machine comprising a chuck table for holding a workpiece, a laser beam application means for applying a laser beam to the workpiece held on the chuck table, a processing feed means for moving the chuck table and the laser beam application means relative to each other in a processing feed direction (X direction), an indexing-feed means for moving the chuck table and the laser beam application means relative to each other in an indexing-feed direction (Y direction) perpendicular to the processing feed direction (X direction), a processing feed amount detection means for detecting the processing feed amount of the processing feed means, an indexing feed amount detection means for detecting the indexing feed amount of the indexing-feed means, and control means for controlling the laser beam application means, the processing feed means and the indexing-feed means based on detection signals from the processing feed amount detection means and the indexing feed amount detection means, wherein the laser beam application means comprises laser beam oscillation means for oscillating a laser beam and a condenser for converging the laser beam oscillated by the laser beam oscillation means, and the condenser comprises a focal spot changing means for changing the shape of a focal spot between an elliptic spot and a circular spot and a focal spot rotating means for rotating the elliptic focal spot formed by the focal spot changing means with the optical axis as the center thereof; and the control means comprises a storage means for storing the X and Y coordinate values of the processing lines having linear portions and curved portions formed on the workpiece, obtains the X and Y coordinate values of the current laser beam application position based on detection signals from the processing feed amount detection means and the indexing feed amount detection means, activates the processing feed means and the indexing-feed means to move a processing line formed on the workpiece to the application position of a laser beam based on the X and Y coordinate values of the processing line stored in the storage means and the X and Y coordinate values of the detected current position, activates the focal spot changing means to make an elliptic focal spot and activates the focal spot rotating means to position the long axis of the elliptic focal spot along a linear portion of the processing line when the linear portion of the processing line is located at the application position of the laser beam, and activates the focal spot changing means to make a circular focal spot when a curved portion of the processing line is located at the application position of the laser beam.

* * * * *